United States Patent
Vargas Vargas

(10) Patent No.: US 12,091,336 B2
(45) Date of Patent: Sep. 17, 2024

(54) COMPOSITION AND METHOD FOR PURIFYING, DISINFECTING AND CLARIFYING WATER

(71) Applicant: Jorge Javier Vargas Vargas, Bucaramanga (CO)

(72) Inventor: Jorge Javier Vargas Vargas, Bucaramanga (CO)

(*) Notice: Subject to any disclaimer, the term of this patent is extended or adjusted under 35 U.S.C. 154(b) by 553 days.

(21) Appl. No.: 17/293,893

(22) PCT Filed: Nov. 13, 2019

(86) PCT No.: PCT/IB2019/059748
§ 371 (c)(1),
(2) Date: May 13, 2021

(87) PCT Pub. No.: WO2020/100059
PCT Pub. Date: May 22, 2020

(65) Prior Publication Data
US 2022/0002173 A1    Jan. 6, 2022

(30) Foreign Application Priority Data
Nov. 13, 2018    (CO) .................. NC2018/0012207

(51) Int. Cl.
| | | |
|---|---|---|
| *C02F 1/52* | (2023.01) | |
| *C02F 1/28* | (2023.01) | |
| *C02F 1/50* | (2023.01) | |
| *C02F 1/56* | (2023.01) | |
| *C02F 1/58* | (2023.01) | |
| *C02F 1/76* | (2023.01) | |
| *C02F 101/10* | (2006.01) | |
| *C02F 101/16* | (2006.01) | |
| *C02F 101/20* | (2006.01) | |
| *C02F 101/30* | (2006.01) | |
| *C02F 101/32* | (2006.01) | |

(52) U.S. Cl.
CPC .............. *C02F 1/56* (2013.01); *C02F 1/286* (2013.01); *C02F 1/50* (2013.01); *C02F 1/5245* (2013.01); *C02F 1/5263* (2013.01); *C02F 1/76* (2013.01); *C02F 2101/105* (2013.01); *C02F 2101/16* (2013.01); *C02F 2101/20* (2013.01); *C02F 2101/301* (2013.01); *C02F 2101/306* (2013.01); *C02F 2101/308* (2013.01); *C02F 2101/32* (2013.01); *C02F 2303/02* (2013.01); *C02F 2303/04* (2013.01); *C02F 2305/023* (2013.01)

(58) Field of Classification Search
CPC .... C02F 1/56; C02F 1/286; C02F 1/50; C02F 1/5245; C02F 1/5263; C02F 1/76; C02F 2101/105; C02F 2101/16; C02F 2101/20; C02F 2101/301; C02F 2101/306; C02F 2101/308; C02F 2101/32; C02F 2303/02; C02F 2303/04; C02F 2305/023
See application file for complete search history.

(56) References Cited

U.S. PATENT DOCUMENTS

| | | |
|---|---|---|
| 2002/0121484 A1 | 9/2002 | Arai et al. |
| 2004/0026657 A1 | 2/2004 | Souter et al. |

FOREIGN PATENT DOCUMENTS

| | | |
|---|---|---|
| CN | 108358270 A | 8/2018 |
| CN | 108557910 A | 9/2018 |
| EP | 2113488 A1 | 11/2009 |
| EP | 2655264 A1 | 10/2013 |
| WO | 1993004986 A1 | 3/1993 |
| WO | 2002000557 A3 | 1/2002 |

OTHER PUBLICATIONS

Extraction Heavy Metals from Contaminated Water Using Chelating Agents, Qahtani, Orient. J. Chem., vol. 33(4), 1698-1704 (2017).*

* cited by examiner

*Primary Examiner* — Haidung D Nguyen
(74) *Attorney, Agent, or Firm* — The Morales Law Firm; Joseph L. Morales, Esq.

(57) ABSTRACT

The invention corresponds to a composition for the treatment of polluted water and the method for the corresponding water treatment, wherein the composition comprises a flocculant, a stabilizer, an algaecide and further comprising chelator, disinfectant and oxygenator, wherein after diluting the composition in polluted water under certain stirring conditions, a water with properties of total hardness, total chlorine, total bromine, free chlorine, pH, alkalinity and cyanuric acid of a potable water is obtained.

3 Claims, No Drawings

COMPOSITION AND METHOD FOR PURIFYING, DISINFECTING AND CLARIFYING WATER

FIELD OF INVENTION

The present invention is directed to compositions and treatment methods for water purification, disinfection and clarification. The methods and compositions of the present application may be used domestically or at an industrial level to obtain potable water suitable for human and animal consumption from contaminated water.

BACKGROUND

The shortage of potable water in rural and remote areas, far from electricity and aqueduct services, together with the delay in purification time and the short useful life of purifiers, make it necessary to develop new inventions to solve these limitations. Water treatments using physical and chemical purification methods are usually known, such as boiling, reverse osmosis, filtration with ceramic filters and/or activated carbon using ozone, UV rays, chlorine or ionic silver, among others.

Patent US20040026657 relates to compositions, methods and kits for purifying potable water, comprising a primary coagulant material and an intermediate flocculant material in certain ranges for domestic or personal use, which allows purifying small quantities of water (up to 10 L). In some embodiments, it includes a cationic coagulant, a microbial disinfectant (70% calcium hypochlorite), a water-soluble alkali, a water insoluble silicate and a food additive or nutrient source. However, the purification method of this document has some drawbacks, such as short residual action with a duration of 3 days, short shelf life, and it is only for domestic or personal use (purification is for small quantities).

Additionally, patent WO1993004986 discloses an invention for the control of microorganisms in bulk quantities of water, composed of a complex halogen (chlorine) and an oxidizing agent (ozone) combination, wherein the balance between a forum iodine and free iodine interacts with the microorganisms oxidizing them. Among the limitations of this document, it requires excess oxidizing agents and produces a corrosive effect. Moreover, due to the loss of iodine, it is necessary to recharge the system with different chemicals, due to its chemical instability. It is a costly method given the expenditure of energy and resources, the stability of the product depends on the composition and operating conditions, because iodine may not be very stable. In addition, this method requires a lot of time to be implemented and to perform the water treatment, a strict control and monitoring of conditions (such as pH) and of the components added to the water body, involving highly trained operators to carry out such tasks, as well as the use of equipment such as motor pumps allowing the constant movement of water. Moreover, it does not guarantee a long-lasting stability that allows subsequent human consumption, it has no residual action and requires an electrical source. This product cannot be used manually by a person who does not have extensive scientific knowledge or equipment to carry out this method.

Several of the compositions or methods available for water treatment do not remove all contaminants and trihalomethanes and may take hours or even days to achieve the results they promise.

The method and composition of the present invention provides a chemical and biological solution to the process of polluted water purification, disinfection and clarification of easy application (manual—mechanical) and fast result that oxygenates the water, removes or prevents the development of algae, has residual action, removes odors and tastes, purifies sludge, heavy metals, pesticides, herbicides, hydrocarbons, surfactants, dyes, oils, foams, phosphorus, ammonium, ammonia and nitrogenous substances, to purify, disinfect and clarify water in large and small quantities.

DETAILED DESCRIPTION

This application presents a product and a method for water treatment. Among the advantages of the product and method, there is purification of large and small quantities of water, the treatment may be for domestic (manual) or industrial use, it is a method of easy application, it is a method of fast result and residual action, which means the treatment guarantees the shelf life of water, since it does not require increasing the disinfectant dose to keep it potable. Furthermore, the product of the present application oxygenates the water, in particular, the product accelerates the biological and chemical purification process. Moreover, the product removes organic and inorganic matter from sludge, pathogenic microorganisms, heavy metals, emerging compounds, herbicides, pesticides, ammonium, ammonia, phosphorus, hydrocarbons, oils, dyes, odor and taste. Finally, the product of the present application inhibits the formation of algae and bacterial biofilm to facilitate water oxygenation.

In general terms, the composition is a solid formulation comprising a flocculant, a stabilizer and an algaecide.

Electrostatically, flocculants adsorb organic and inorganic contaminants and microscopic particles by increasing their size and grouping them together to form a gel that performs the water-clarification primary function. Possible flocculants include: cationic bentonite (low, medium and high molecular weight), preferably high molecular weight, anionic bentonite (low, medium and high molecular weight), preferably high molecular weight, diatomaceous earth (DE, TSS), fish glue, chitosan, carboxymethyl cellulose (CMC), polyacrylamide (PAM), sodium carbonate ($Na_2CO_3$), alginates e.g., calcium alginate, starch ($C_6H_{10}O_5$)$_n$, non-ionic polyelectrolytes, cationic polyelectrolytes, anionic polyelectrolytes, petroleum bentonite, *Xanthomonas campestris*, silica gel (silicon dioxide), ammonium sulfate (($NH_4$)$_2SO_4$), alumina sulfate, calcium bicarbonate, calcium carbonate ($CaCO_3$), lye (NaOH), ferric sulfate, poly iron chloride or iron chloride polymer, poly aluminum chloride (PAC) or mixtures thereof. The composition of the present invention comprises by weight between 10 and 90%, between 1 and 30%, between 30 and 50%, between 20 and 40%, or between 33 and 43% of the flocculant.

Among the stabilizers, there are calcium hydroxide, silica, sodium sulfate, calcium oxide, phosphorus oxide, potassium nitrate, calcium chloride, hydrogen chloride, and mixtures thereof. The composition of the present invention comprises between 1 and 50%, between 1 and 15%, between 5 and 15%, between 7 and 18%, or between 5 and 30% by stabilizer weight.

Algaecides include: polyquaternary ammonium, boric acid ($H_3BO_3$), copper sulfate ($Cu_2SO_4$, $CuSO_4$), sodium hydrogen carbonate ($NaHCO_3$), quaternary ammonium, copper sulfate pentahydrate ($CuSO_4.5H_2O$), chlorine shock which is a mixture of 70% active chlorine and between 3 and 5% a quaternary ammonium, particularly polydialyldimethylammonium (DMDAC), sodium bicarbonate ($NaHCO_3$)

and mixtures thereof. The composition of the present invention comprises between 1 and 50%, between 1 and 15%, between 25 and 40%, between 30 and 40%, or between 15 and 50% by algaecide weight.

The compositions and methods of the invention may comprise a chelator, wherein their function is to adsorb heavy metals by transforming them into chelates, so they are suitable to be metabolized by humans. Among the chelators, there are EDTA, BRA, DEHA, DEAE, MDDA, HEDDP, TPMP, NAP, oxalate and mixtures thereof. If the composition includes a chelator, the composition comprises between 1 and 60%, between 5 and 40%, or between 5 and 10% by chelator weight.

The compositions and methods of the invention may comprise a disinfectant that performs the function of removing pathogenic microorganisms and algae. Disinfectants include sodium hypochlorite (NaClO), sodium chlorite (NaClO$_2$), sodium fluoride (NaF), perchlorate, potassium permanganate (KMnO$_4$), bromate, calcium hypochlorite (Ca(ClO)$_2$), chlorine dioxide, iodine, ozone, sodium perborate (NaBO$_3$), hydrogen peroxide (H$_2$O$_2$), sodium percarbonate, trichloro or mixtures thereof. If the composition includes a disinfectant, the composition comprises between 1 and 40%, between 15 and 35%, between 10 and 35%, between 1 and 20%, between 5 and 15%, or between 10 and 12% by weight of disinfectant.

The compositions and methods of the invention may comprise an oxygenating agent that performs the function of chemically producing oxygen to oxidize and accelerate water purification, both chemically and biologically. Oxygenators include dioxol, dioxydiphenol, sodium percarbonate, perborate, sodium fluoride (NaF), sodium carbonate (Na$_2$CO$_3$), hydrogen peroxide (H$_2$O$_2$), benzoyl peroxide (C$_{14}$H$_{10}$O$_4$), dioxidane, methyl hydroperoxide, ethyl peroxide, phenyl peroxide, dipropyl peroxide, ozone, oxalic acid (H$_2$C$_2$O$_4$), potassium permanganate (KMnO$_4$), nitrifying bacteria or mixtures thereof. Nitrifying bacteria are chemolithotrophic organisms including species of the genera *Nitrosomonas, Nitrosococcus, Nitrobacter* and *Nitrococcus*. If the composition includes an oxygenate, it comprises between 1 and 40%, between 2 and 18%, between 1 and 20%, between 5 and 15%, between 15 and 20%, or between 10 and 12% by weight of oxygenate.

The compositions and methods of the invention may comprise a coagulator. Coagulators include alumina sulfate, diatomaceous earth, calcium bicarbonate, sodium carbonate, ferric sulfate or mixtures thereof. If the composition includes a coagulator, the composition comprises between 1 and 30% by weight of coagulators.

The method disclosed herein is used for purifying, clarifying and disinfecting waters. The method of purifying, disinfecting and clarifying bodies of water is performed by adding a composition comprising the aforesaid groups of components, which act simultaneously by stirring with circular motions in the water in one direction only, and dissolving at the same time until flocs of contaminating material are formed and subsequently filtered.

Thus, the method for water treatment of the present application occurs in two main stages. The first is an stirring stage and a second separation stage. Water to be treated means contaminated water or water in unsuitable condition for human consumption.

The stirring stage and the separation stage may be carried out manually and/or mechanically. Manually, it may be applied on small quantities. Small quantities are understood as volumes of water below 2000 L. This solution may be used when there is no access to aqueducts and/or electric power to perform separation, for example in places where water for consumption comes from rivers, lagoons, stagnant wells that contain mud and are cloudy.

On the other hand, mechanically it may be used in large quantities of water such as pools or aqueducts, among others. Large quantities are understood as volumes greater than 2000 L that normally require motor-pump equipment for stirring and filters for separation.

In the case of large quantities, the process may require the use of motor pumps for recirculation, which may take between 1 and 2 hours. Compared to the treatment times in a conventional water treatment plant, which takes between 8 and 12 hours, or at least 3 and a half hours. This difference is because the composition modifies the magnetochemistry of the contaminated water by stabilizing the charge, considering that organic and inorganic waste usually have a negative charge that with the help of the composition, which has a positive charge, allows the capture of the inorganic and organic waste nanoparticles. When the charge stabilization is obtained, each of the components of the formulation may begin to perform the corresponding functions synergistically, in order to start water purification.

The stirring may be carried out in a circular way by means of hydraulic or mechanical movements, generating for example a circular turbulence. Stirring is carried out between 10 and 500 rpm, between 100 and 200 rpm, between 80 and 200 rpm, or between 50 and 120 rpm, for a period of time between 1 and 120 minutes, between 1 and 60 minutes, between 10 and 45 minutes, between 30 and 45 minutes, between 5 and 10 minutes, between 10 and 20 minutes, or between 20 and 30 minutes, depending on the stirring conditions. Once the flocs are formed, the stirring is stopped because this means that the organic and inorganic impurities are already grouped. These flocs are attracted to each other until they form a gel that is located in the upper part of the water (it floats) and allows an easier filtration of impurities.

The separation stage may comprise filtration through a membrane system or by means of a sieve. Subsequently, the water body is left to stand while chlorine gasification occurs, preferably. It is left to stand between 10 and 30 minutes, depending on the amount of water and composition used.

In order to carry out the method, an amount of the composition is incorporated into the water to be treated, in such a manner to use between 0.1 g and 20.0 g of composition per liter of contaminated water, between 0.5 and 5.0 g of composition per liter of contaminated water, or between 0.2 and 3.0 of composition per liter of contaminated water or 0.5 of composition per liter of contaminated water, 1 g of composition per 2 L of contaminated water, 0.5 g of composition per 1 L of contaminated water.

In a preferred embodiment, the stabilizers are mixed, then the flocculants, chelators and finally the oxygenators are added.

EXAMPLES

In cases where it is not specified, 1 g of each formulation was applied in 2 L of contaminated water, i.e., 0.5 g per 1 L of contaminated water. The 2 L of contaminated water were placed in a container, then 1 g of the product was applied and stirred constantly for 10 minutes until flocs were formed. After the first 3 minutes, clots begin to form where the contaminating components are adsorbed and agglomerate with each other (magnetochemistry), these flocs rise to the surface and agglomerate into a floc, they do not separate. After 10 minutes, stirring is stopped and the water is allowed to stand for 5 minutes. Subsequently, the flocs may be collected superficially or may be passed through a filtration equipment or method.

Potability results were obtained from tests performed from Aquachek.7

Example 1. Formulation 4

TABLE 1

Composition of Formulation 4

| Components | Weight (g) |
|---|---|
| Quicklime (stabilizer) | 1.0 |
| Sodium percarbonate (disinfectant/oxygenator) | 0.8 |
| High molecular weight cationic bentonite (flocculant) | 1.5 |
| Iron polychloride (flocculant) | 1.5 |
| Chlorine shock (stabilizer, algaecide) | 2.5 |
| EDTA (chelators) | 0.5 |

TABLE 2

Composition by groups for Formulation 4

| | Percentage (%) |
|---|---|
| Stabilizer | 12.8 |
| Disinfectant/oxygenator | 10.3 |
| Flocculant | 38.5 |
| Algaecide | 32.1 |
| Chelator | 6.4 |

Description of the results obtained with Formulation 4. Excellent results were obtained after 5 minutes, the oxygen was well activated with the chlorine and the lime was removed; the synergy that did not allow activating its reaction with the other components, such as the combination of high molecular weight cationic bentonite with iron polychloride and EDTA that softens the water and removes heavy metals, after 3 minutes the flocs formed well and the gel conglomerate was formed. It had an excellent adsorption of pollutants, the mud and organic residues were suspended on the surface of the water grouped in the gel and at the bottom there was no particle left, it clarified the water and removed bad odors, giving it brightness and crystalline clarity.

TABLE 3

Water properties before and after addition of Formulation 4

| | Before treatment | After treatment |
|---|---|---|
| Total hardness (ppm) | 100 | 250 |
| Total chlorine (ppm) | 0 | 3 |
| Total bromine (ppm) | 0 | 5 |
| Free chlorine | 0 | 3 |
| pH | 6.2 | 9 |
| Alkalinity (ppm) | 120 | 240 |
| Cyanuric acid (ppm) | 30-40 | 300 |

Example 2. Formulation 7

TABLE 4

Composition of Formulation 7

| Components | Weight (g) |
|---|---|
| Quicklime (stabilizer) | 10 |
| Cationic bentonite (flocculant) | 15 |
| Iron chloride polymer (flocculant) | 15 |
| Sodium percarbonate (disinfectant/oxygenator) | 10 |
| Chlorine shock (stabilizer, algaecide) | 30 |
| EDTA (chelator) | 6 |
| *Xanthomas campestri* (flocculant) | 5 |

TABLE 5

Composition by groups for Formulation 7

| | Percentage (%) |
|---|---|
| Stabilizer | 10.99% |
| Disinfectant/oxygenator | 10.99% |
| Flocculant | 38.46% |
| Algaecide | 32.97% |
| Chelator | 6.59% |

Description of the results obtained with Formulation 7. It performed all the functions, but the water was not totally crystalline and bright, it had a slightly cloudy, translucent color, flocculated and coagulated by flotation but did not gel, forming a thin gel on the surface.

TABLE 6

Water properties before and after addition of Formulation 7

| | Before treatment | After treatment |
|---|---|---|
| Total hardness (ppm) | 100 | 0 |
| Total chlorine (ppm) | 0.5 | 3 |
| Total bromine (ppm) | 1 | 5 |
| Free chlorine | 0 | 10 |
| pH | 6.2 | 7.8 |
| Alkalinity (ppm) | 0 | 120 |
| Cyanuric acid (ppm) | 0 | 30.0-50.0 |

Example 3. Formulation ZX

TABLE 7

Composition of the ZX Formulation

| Components | Peso (g) |
|---|---|
| Chlorine shock (stabilizer, algaecide) | 30.,0 |
| PAC aluminum polychloride (flocculant) | 30.0 |
| Cationic bentonite (flocculant) | 10.0 |
| Lime (stabilizer) | 15.0 |
| EDTA (chelators) | 8.0 |
| Sodium percarbonate (disinfectant, oxygenator) | 8.0 |

TABLE 8

Composition by groups for the ZX Formulation

| | Quantity (g) | Percentage (%) |
|---|---|---|
| Stabilizer | 15 | 14.9 |
| Disinfectant/oxygenator | 8 | 7.9 |

TABLE 8-continued

Composition by groups for the ZX Formulation

|  | Quantity (g) | Percentage (%) |
|---|---|---|
| Flocculant | 40 | 39.6 |
| Algaecide | 30 | 29.7 |
| Chelator | 8 | 7.9 |

Description of the results obtained with Formulation ZX. Formulation ZX was the most successful in terms of compliance with the potabilization ranges, with optimal results in terms of clarification, flocculation, coagulation and filtration, pH, free chlorine, alkalinity, cyanuric acid and hardness. These last three are chemically unstable and in this ZX formulation they were all balanced and activated at the same time, the ZX formulation also performed well and gives good potability standards that may be used as a parameter that works within the ranges.

TABLE 9

Properties of water before and after addition of Formulation ZX

|  | Before treatment | After treatment |
|---|---|---|
| Total hardness (ppm) | 100 | 250 |
| Total chlorine (ppm) | 0.5 | 10 |
| Total bromine (ppm) | 1 | 20 |
| Free chlorine | 0 | 5 |
| pH | 6.2 | 7.8 |
| Alkalinity (ppm) | 0 | 120 |
| Cyanuric acid (ppm) | 0 | 30-50 |

Example 4. Formulation YZ

TABLE 10

Composition of Formulation YZ

| Components | Weight (g) |
|---|---|
| Lime (stabilizer) | 10.0 |
| Sodium percarbonate (disinfectants) | 8.0 |
| Cationic bentonite (flocculant) | 15.0 |
| PAC aluminum polychloride (flocculant) | 15.0 |
| Chlorine shock (stabilizer, algaecide) | 25.0 |
| EDTA (chelators) | 5.0 |

TABLE 11

Composition by groups for Formulation YZ

|  | Quantity (g) | Percentage (%) |
|---|---|---|
| Stabilizer | 10 | 12.8 |
| Disinfectant/oxygenator | 8 | 10.3 |
| Flocculant | 30 | 38.5 |
| Algaecide | 25 | 32.1 |
| Chelator | 5 | 6.4 |

Description of the results obtained with Formulation YZ. 0.5 g of Formulation YZ was applied to 1 liter of water from contaminated lake 2, where good results were seen, such as the ratio, flocculation and coagulation by flotation and clarification. Stirring was stopped after 10 minutes, after 5 minutes left to stand it was filtered, left for another 5 minutes and the water was crystal clear.

TABLE 12

Water properties before and after the addition of Formulation YZ

|  | Before treatment | After treatment |
|---|---|---|
| Total hardness (ppm) | 100 | 100 |
| Total chlorine (ppm) | 0.5 | 0 |
| Total bromine (ppm) | 1 | 0 |
| Free chlorine | 0 | 0 |
| pH | 6.2 | 5.8 |
| Alkalinity (ppm) | 0 | 40 |
| Cyanuric acid (ppm) | 0 | 0 |

Example 5. Results Comparison

TABLE 13

Properties of water before and after addition of Formulation 4

|  | Before treatment | After treatment | | | |
|---|---|---|---|---|---|
|  |  | Formulation 4 | Formulation 7 | Formulation ZX | Formulation YZ |
| Total hardness (ppm) | 100 | 250 | 0 | 250 | 100 |
| Total chlorine (ppm) | 0.5 | 3 | 3 | 10 | 0 |
| Total bromine (ppm) | 1 | 5 | 5 | 20 | 0 |
| Free chlorine | 0 | 3 | 10 | 5 | 0 |
| pH | 6.2 | 9 | 7.8 | 7.8 | 5.8 |
| Alkalinity (ppm) | 0 | 240 | 120 | 120 | 40 |
| Cyanuric acid (ppm) | 0 | 300 | 30.0-50.0 | 30-50 | 0 |

The previous formulations gave established potability values, hardness should be between 100 ppm and 1000 pm, ideally between 250 and 500; total chlorine should be between 0.5 ppm and 10 ppm, ideally 3 ppm; bromine should be a minimum of 1 and maximum of 20, ideally 5 ppm; free chlorine should be between 0.5 and maximum 10, ideally between 3 and 5; pH should be a minimum of 6.8 and maximum 8.4, ideally 7.2 and 7.8; alkalinity should be between 40 ppm and 180 ppm, ideally between 80 and 120 ppm; finally cyanuric acid should be between 0 and 150 ppm, ideally between 30 and 50.

The invention claimed is:

1. A composition for water treatment consisting of:
   a flocculant between 10% and 70% by weight, selected from cationic bentonite, chitosan, carboxymethyl cellulose, polyacrylamide (PAM), *Xanthomonas campestris*, poly iron chloride, poly aluminum chloride (PAC) or mixtures thereof;
   a stabilizer between 5% and 30% by weight, selected from calcium hydroxide, calcium oxide or quicklime, silica, calcium chloride, or mixtures thereof;
   an algaecide between 15% and 50% by weight, selected from chlorine shock, sodium bicarbonate or mixtures thereof; wherein chlorine shock corresponds to a mixture of 70% active chlorine and between 3 and 5% a quaternary ammonium;
   a chelator between 5% and 40% by weight, which is ethylenediaminetetraacetic acid (EDTA); and a disinfectant/oxygenant between 5% and 15% by weight, selected from perchlorate, ozone, hydrogen peroxide, sodium percarbonate or mixtures thereof.

2. The composition according to claim 1, wherein the flocculant is bentonite, the stabilizer is quicklime, the algaecide is chlorine shock, the chelator is EDTA, and the disinfectant/oxygenant is sodium percarbonate.

3. The composition according to claim 1 wherein:

the flocculant has a concentration of between 20% and 40% by weight, selected from cationic bentonite, poly aluminum chloride (PAC) and mixtures thereof;

the stabilizer has a concentration of between 7% and 18% by weight, selected from quicklime, silica, and mixtures thereof;

the algaecide has a concentration of between 25% and 40% by weight, which is chlorine shock, and corresponds to a mixture of 70% active chlorine and between 3 and 5% a quaternary ammonium;

the chelator has a concentration of between 5% and 10% by weight, which is EDTA; and the disinfectant/oxygenant is sodium percarbonate in a concentration of between 5% and 15% by weight.

\* \* \* \* \*